(12) United States Patent
Yamaguchi (10) Patent No.: US 9,094,614 B2
(45) Date of Patent: Jul. 28, 2015

(54) IMAGING DEVICE, IMAGING METHOD AND IMAGING PROGRAM STORED COMPUTER READABLE MEDIUM

(75) Inventor: Akira Yamaguchi, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 252 days.

(21) Appl. No.: 13/600,036

(22) Filed: Aug. 30, 2012

(65) Prior Publication Data

US 2013/0070110 A1  Mar. 21, 2013

(30) Foreign Application Priority Data

Sep. 21, 2011  (JP) .................................. 2011-206131

(51) Int. Cl.
  *H04N 5/235* (2006.01)
(52) U.S. Cl.
  CPC .................................. *H04N 5/2354* (2013.01)
(58) Field of Classification Search
  CPC .... H04N 5/235; H04N 5/2351; H04N 5/2354
  USPC .................................................. 348/362, 364
  See application file for complete search history.

(56) References Cited

U.S. PATENT DOCUMENTS

| | | | |
|---|---|---|---|
| 6,351,286 B1* | 2/2002 | Ikami et al. | 348/362 |
| 6,791,618 B1* | 9/2004 | Shimizu | 348/362 |
| 6,839,087 B1* | 1/2005 | Sato | 348/362 |
| 7,920,733 B2* | 4/2011 | Matsuo et al. | 382/129 |
| 2003/0030740 A1* | 2/2003 | Tsujino | 348/333.01 |
| 2005/0078285 A1* | 4/2005 | Park | 355/27 |
| 2005/0174451 A1* | 8/2005 | Nozaki et al. | 348/240.99 |
| 2010/0328485 A1* | 12/2010 | Imamura et al. | 348/222.1 |
| 2012/0162462 A1* | 6/2012 | Takeuchi | 348/222.1 |
| 2013/0243283 A1* | 9/2013 | Kotchou et al. | 382/128 |

FOREIGN PATENT DOCUMENTS

| | | |
|---|---|---|
| JP | 2000-111478 A | 4/2000 |
| JP | 2005-214924 A | 8/2005 |

(Continued)

OTHER PUBLICATIONS

Japanese Office Action issued by JPO on Jul. 30, 2013 in connection with corresponding Japanese Patent Application No. 2011-206131.

(Continued)

*Primary Examiner* — Sinh Tran
*Assistant Examiner* — Zhenzhen Wu
(74) *Attorney, Agent, or Firm* — Jean C. Edwards, Esq.; Edwards Neils, PLLC (57) ABSTRACT

There is provided an imaging device including: an image pick-up device for imaging a chemiluminescent imaging subject; a pre-exposure section that performs pre-exposure of the image pick-up device to the imaging subject plural times to acquire plural pre-exposure images; a light emission characteristic calculation section that calculates the light emission characteristics of the chemiluminescent imaging subject based on the plural pre-exposure images; an exposure time calculation section that calculates an exposure time for main exposure corresponding to a target density for the imaging subject based on the light emission characteristics; and a main exposure section that performing main exposure to the imaging subject with the calculated exposure time so as to acquire a main exposure image.

5 Claims, 8 Drawing Sheets

(56) References Cited

FOREIGN PATENT DOCUMENTS

| | | |
|---|---|---|
| JP | 3678397 B2 | 8/2005 |
| JP | 2006317406 A | 11/2006 |
| JP | 2008-082922 | 4/2008 |

OTHER PUBLICATIONS

Office Action issued by Japanese Patent Office on Jan. 14, 2014 in connection with corresponding Japanese Patent Application No. 2011-206131.

* cited by examiner

IMAGING DEVICE, IMAGING METHOD AND IMAGING PROGRAM STORED COMPUTER READABLE MEDIUM

CROSS-REFERENCE TO RELATED APPLICATION

This application is based on and claims priority under 35 USC 119 from Japanese Patent Application No. 2011-206131 filed on Sep. 21, 2011, the disclosure of which is incorporated by reference herein.

BACKGROUND

1. Technical Field

The present invention relates to an imaging device, an imaging method and a computer readable medium stored with an imaging program.

2. Related Art

In the fields of biochemistry there are proposals for imaging devices for imaging a fluorescent sample marked with a fluorescent dye as an imaging subject by illuminating with excitation light to cause fluorescent light to be emitted, as well for imaging as an imaging subject of a chemiluminescent sample that has been placed in contact with a chemiluminescent substrate using a long exposure time without excitation light illumination.

For example, a device is disclosed in Japanese Patent No. 3678397 that stores a look-up table of types of imaging techniques corresponded against exposure times (preliminary exposure times) for preliminary imaging in order to derive an appropriate exposure time for a main exposure. A preliminary exposure time is derived according to an input type of imaging technique by referring to the look-up table, and then the main exposure time is set based on the preliminary image signal arising during preliminary imaging using the derived preliminary exposure time.

A device is disclosed in Japanese Patent Application Laid-Open (JP-A) No. 2000-111478 in which a scheduled exposure completion time and one or more exposure check times during exposure are set in advance. The optimal exposure time for a chemiluminescent exposure and imaging can then be efficiently searched for by storing images captured at each exposure check time in an image storage section and displaying the captured images on a monitor section.

A device is disclosed in JP-A No. 2005-214924 in which cells for observation are disposed on a carrier, and images of fluorescence emitted from the cells due to illumination with excitation light are acquired by an imaging system in a time series at specific intervals. In order to prevent fluorescent intensity saturation a fluorescent image obtained the preceding time is employed to determine the exposure amount for imaging the next fluorescent image to be obtained.

In the technology of Japanese Patent No. 3678397 the main exposure time is set using a preset look-up table. Therefore for an imaging subject of a chemiluminescent sample issues can occur of the main exposure time not being set appropriately and poor density arising when the chemiluminescent sample has degraded or when a chemiluminescent sample not compatible with the look-up table is employed.

SUMMARY

The present invention is made in consideration of the above circumstances and provides an imaging device, imaging method and computer readable medium stored with an imaging program capable of preventing poor density from occurring even in such cases as when a chemiluminescent sample has deteriorated.

In order to address the above issues, a first aspect of the present invention provides an imaging device including:

an image pick-up device for imaging a chemiluminescent imaging subject;

a pre-exposure section that performs pre-exposure of the image pick-up device to the imaging subject plural times to acquire plural pre-exposure images;

a light emission characteristic calculation section that calculates the light emission characteristics of the chemiluminescent imaging subject based on the plural pre-exposure images;

an exposure time calculation section that calculates an exposure time for main exposure corresponding to a target density for the imaging subject based on the light emission characteristics; and a main exposure section that performing main exposure to the imaging subject with the calculated exposure time so as to acquire a main exposure image.

According to the first aspect of the present invention pre-exposure is performed plural times on the imaging subject, the light emission characteristics of the chemiluminescent imaging subject are calculated based on the plural pre-exposure images, and the exposure time for main exposure corresponding to the target density is then calculated based on the light emission characteristics. Poor density can accordingly be prevented from occurring even in such cases as when a chemiluminescent sample has deteriorated.

A second aspect of the present invention provides the imaging device of the first aspect, wherein the pixel size of the pre-exposure images is larger than the pixel size of the main exposure image.

A third aspect of the present invention provides the imaging device of the first aspect, wherein:

the image pick-up device is provided with a pixel summing function; and the pixel summing function is employed to set the pixel size of the plural pre-exposure images larger than the pixel size of the main exposure image.

A fourth aspect of the present invention provides the imaging device of the first aspect, wherein pre-exposure is re-executed with the pixel summing number for pre-exposure increased when there is no change between the plural pre-exposure images.

A fifth aspect of the present invention provides the imaging device of the first aspect, wherein pre-exposure is re-executed with the exposure time for pre-exposure increased when there is no change within the plural pre-exposure images.

A sixth aspect of the present invention provides a computer readable medium stored with an imaging program that causes a computer to function as each of the sections configuring the imaging device of the first aspect.

A seventh aspect of the present invention provides an imaging method including:

performing pre-exposure of an image pick-up device to a chemiluminescent imaging subject plural times to acquire plural pre-exposure images;

calculating light emission characteristics of the chemiluminescent imaging subject based on the plural pre-exposure images;

calculating an exposure time for main exposure corresponding to a target density for the imaging subject based on the light emission characteristics; and performing main exposure to the imaging subject with the calculated exposure time to acquire a main exposure image.

The present invention exhibits the advantageous effect of being able to prevent poor density from occurring even in such cases as when a chemiluminescent sample has deteriorated.

BRIEF DESCRIPTION OF THE DRAWINGS

Exemplary embodiments of the present invention will be described in detail based on the following figures, wherein.

DETAILED DESCRIPTION

Explanation follows regarding exemplary embodiments of the present invention, with reference to the drawings.

Figure 1:
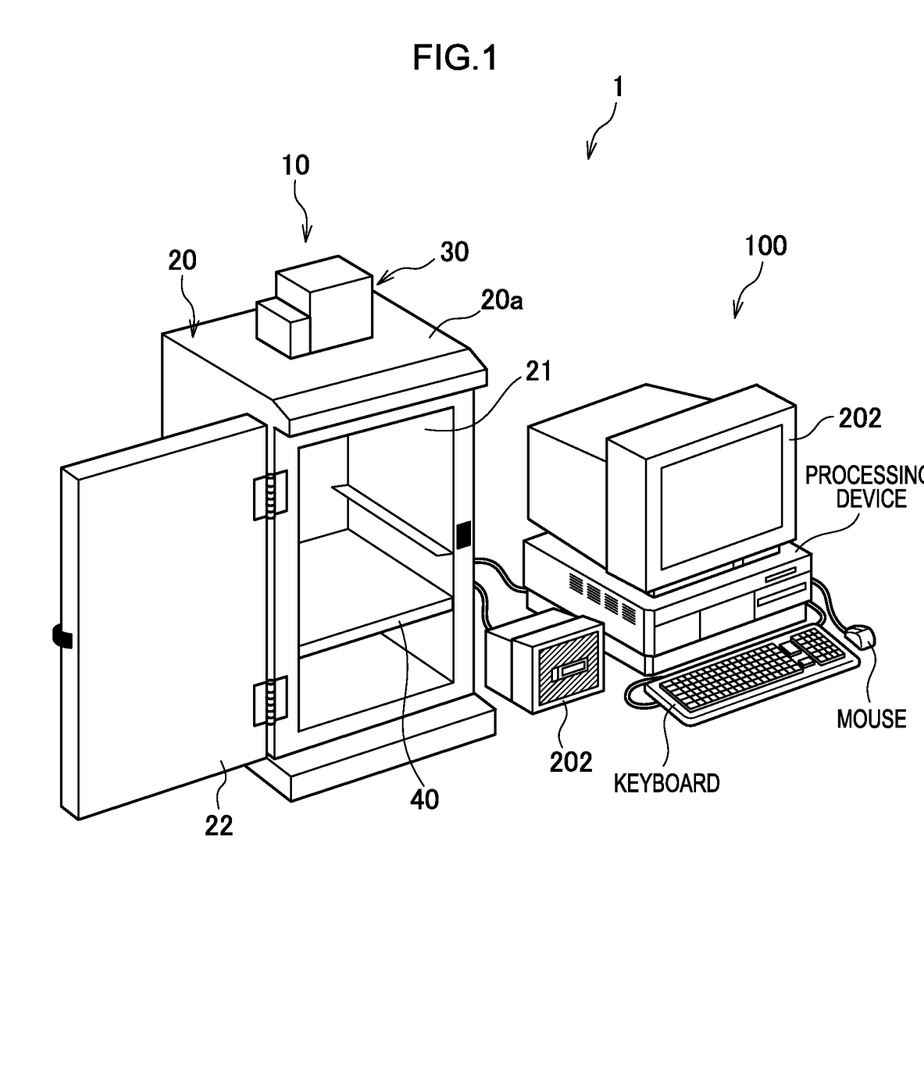
FIG. 1 is a perspective view of an imaging system.

FIG. 1 is a perspective view illustrating an example of an imaging system employing an imaging device according to the present invention. The imaging system 1 is an imaging system for imaging an imaging subject by either illuminating with excitation light or not illuminating with excitation light, according to the imaging subject, so as to acquire an image of the imaging subject. The imaging system 1 is configured including an imaging device 10 and an image processing device 100.

The imaging device 10 images the imaging subject and outputs acquired image data to the image processing device 100. The image processing device 100 subjects the received image data to specific image processing as required and displays the received image data on a display section 202. Explanation follows regarding a case in the present exemplary embodiment in which the imaging subject is one of the chemiluminescent samples referred to above.

Figure 2:
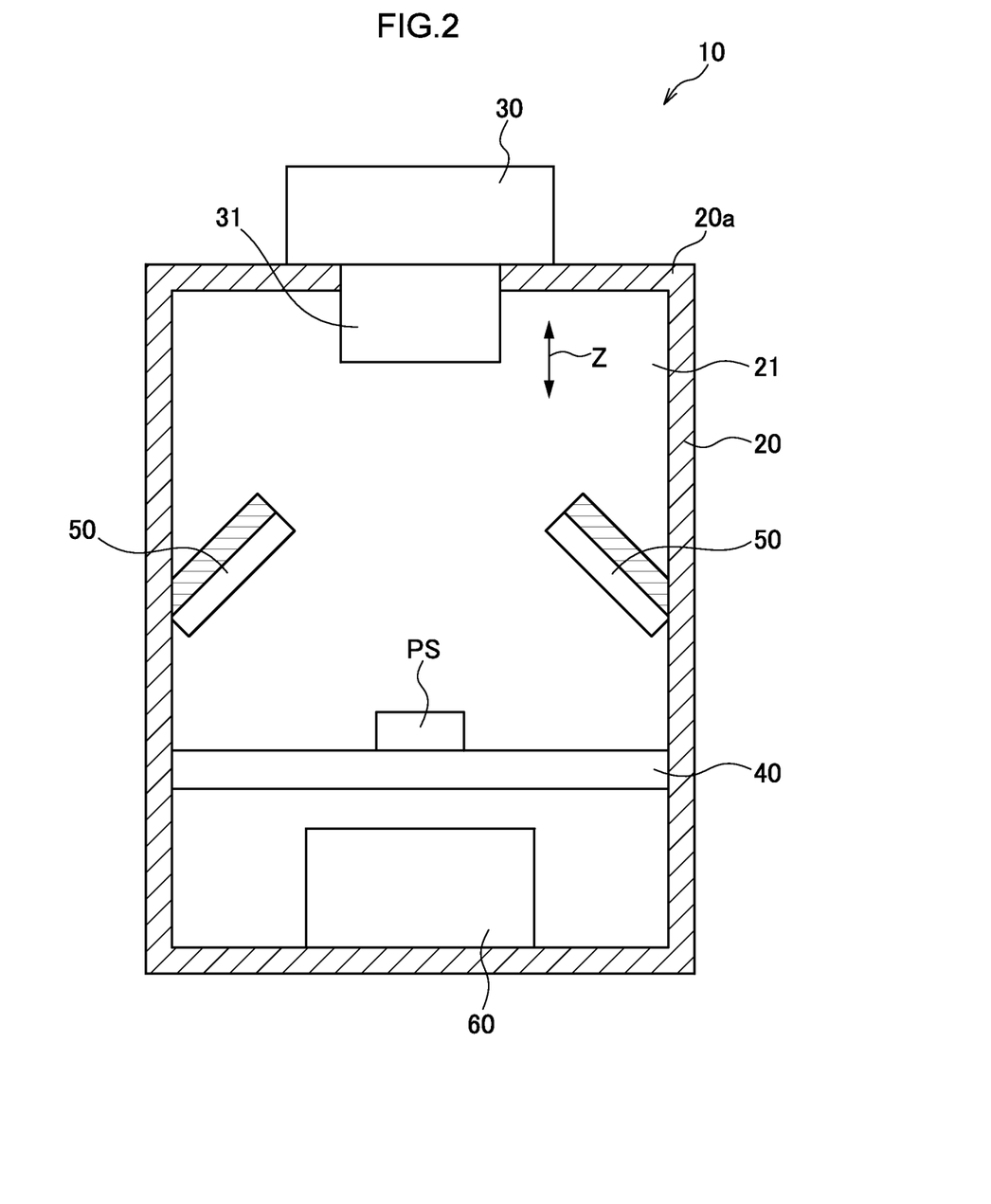
FIG. 2 is a face-on view of an imaging device.

FIG. 2 is a face-on view showing a door 22 (see FIG. 1) of the imaging device 10 in an open state. As shown in FIG. 2 the imaging device 10 is provided with: an imaging subject placement section 40 for housing an imaging subject PS; a casing body 20 that internally houses the imaging subject placement section 40; an imaging section 30 for imaging the imaging subject PS placed in the imaging subject placement section 40; an epi-illumination light source 50 disposed inside the casing body 20 for illuminating excitation light onto the imaging subject PS; and a trans-illumination light source 60.

The casing body 20 has a hollow portion 21 formed in a substantially rectangular shape, and the imaging subject placement section 40 for placing the imaging subject PS thereon is inside the hollow portion 21. The door 22 illustrated in FIG. 1 is attached to the casing body 20 so as to be capable of opening and closing in a configuration that enables a user to open the door 22 and house the imaging subject PS inside the casing body 20. The casing body 20 is configured as a dark-box such that external light does not penetrate inside the hollow portion 21.

The imaging device 10 is configured including an image pick-up device such as a CCD fixed to a top face 20a of the casing body 20, as explained in detail later. A cooling device is attached to the image pick-up device. Noise components due to dark current are prevented from being included in the captured image data by cooling the image pick-up device.

A lens section 31 is attached to the imaging device 10. The lens section 31 is provided so as to be movable in the arrow Z direction for focusing on the imaging subject PS.

The epi-illumination light source 50 emits excitation light towards the imaging subject PS placed on the imaging subject placement section 40. The trans-illumination light source 60 illuminates the imaging subject PS with excitation light from below. During fluorescent sample imaging excitation light is illuminated onto the imaging subject PS from at least one of the epi-illumination light source 50 and/or the trans-illumination light source 60, according to the imaging subject.

Figure 3:
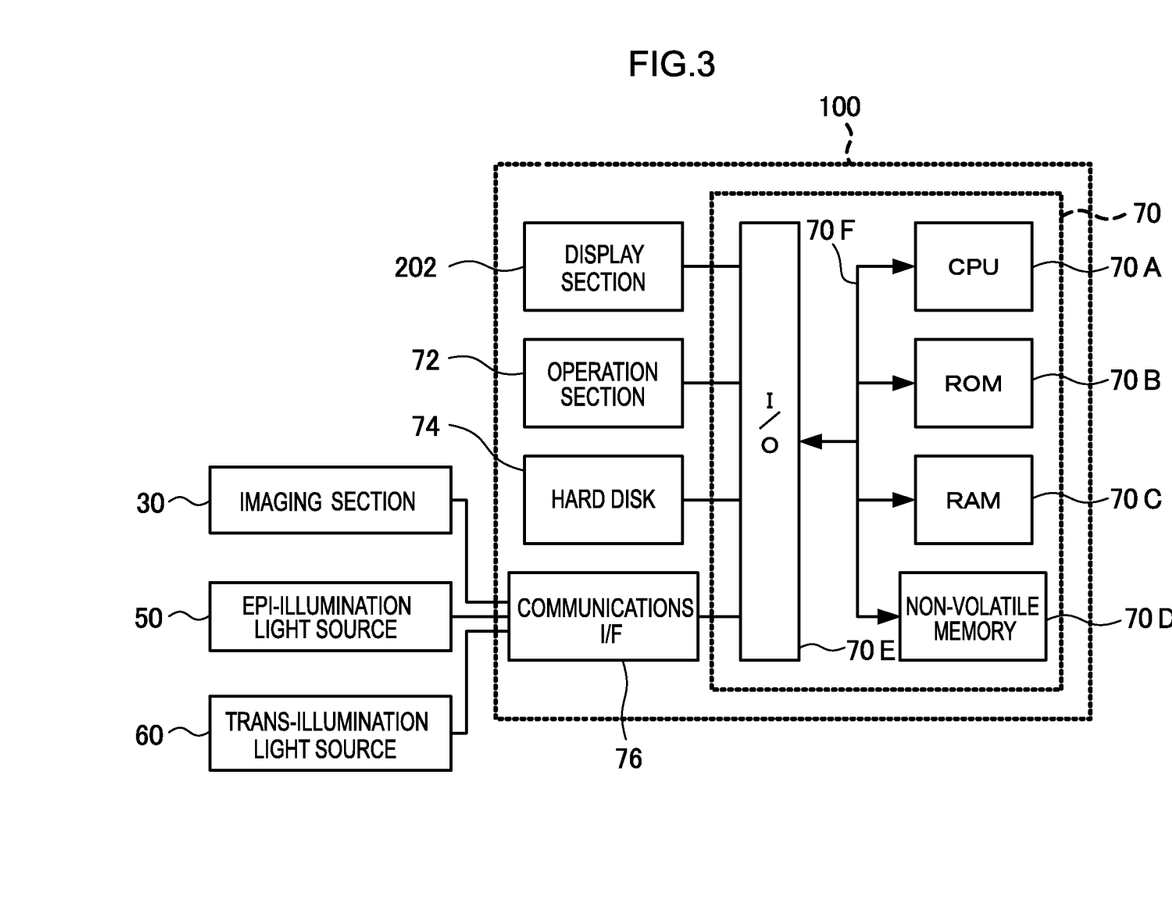
FIG. 3 is a schematic block diagram of an image processing device 100.

FIG. 3 is a schematic configuration diagram of the image processing device 100. As shown in FIG. 3 the image processing device 100 is configured including a main controller 70.

The main controller 70 is configured including a Central Processing Unit (CPU) 70A, Read Only Memory (ROM) 70B, Random Access Memory (RAM) 70C, a non-volatile memory 70D and an input-output (I/O) interface 70E, mutually connected together through a bus 70F.

The display section 202, an operation section 72, a hard disk 74, and a communications I/F 76 are connected to the I/O interface 70E. The main controller 70 provides overall control of each of the functional sections.

The display section 202 is configured from for example a CRT or liquid crystal display device. The display section 202 displays images captured by the imaging device 10 and displays various screens for performing various settings on the imaging device 10 and giving instructions thereto.

The operation section 72 is configured including for example a mouse and a keyboard such that a user can give various instructions to the imaging device 10 by operating the operation section 72.

The hard disk 74 stores image data acquired by the imaging device 10, and stores a control program and various data required for control.

The communications I/F 76 is connected to the imaging section 30, the epi-illumination light source 50 and the trans-illumination light source 60 of the imaging device 10. The CPU 70A instructs the imaging section 30 through the communications I/F 76 to perform imaging under various imaging conditions according to the type of imaging subject. When excitation light is to be illuminated onto the imaging subject PS the CPU 70A instructs at least one of the epi-illumination light source 50 and/or the trans-illumination light source 60 to illuminate excitation light. The CPU 70A also receives image data of images captured with the imaging section 30 and performs processing such as image processing thereon.

Figure 4:
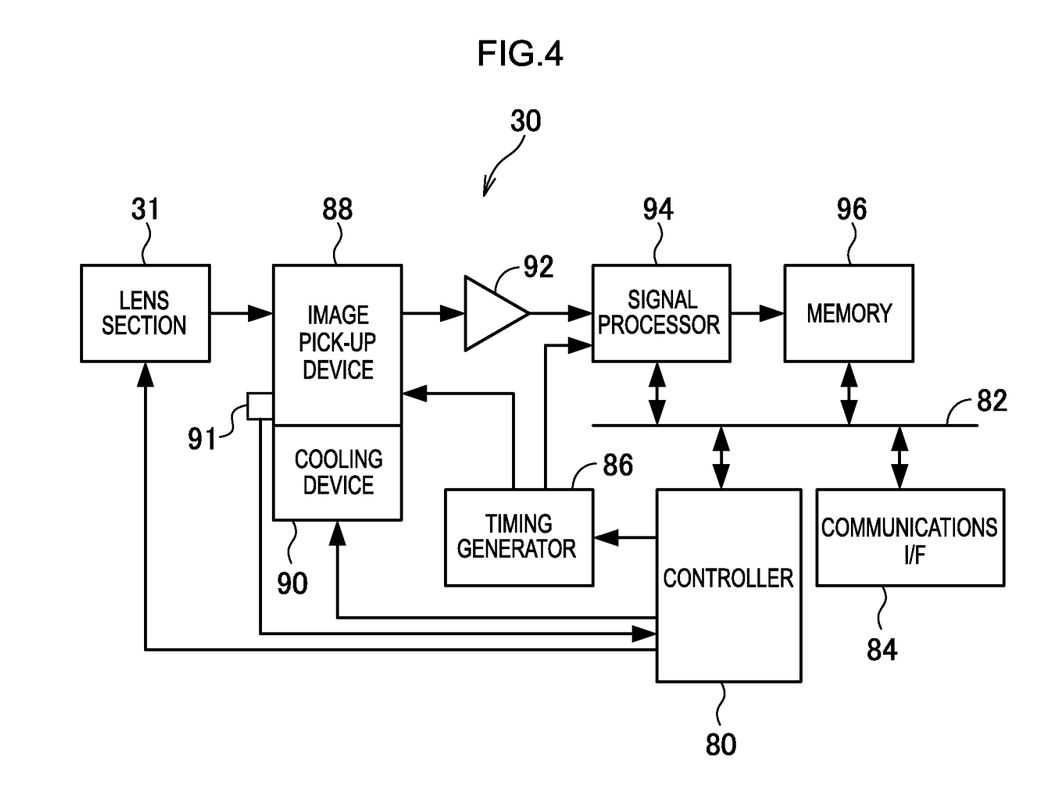
FIG. 4 is a schematic block diagram of an imaging section 30.

FIG. 4 illustrates a schematic configuration of the imaging section 30. As shown in FIG. 4, the imaging section 30 is provided with a controller 80. The controller 80 is connected through a bus 82 to a communications interface (I/F) 84. The communications I/F 84 is connected to the communications I/F 76 of the image processing device 100.

On instruction to perform imaging by the image processing device 100 through the communications I/F 84 the controller 80 controls each section according the instruction content so as to image the imaging subject PS placed on the imaging subject placement section 40, and transmits image data of the captured images to the image processing device 100 through the communications I/F 84.

The controller 80 is connected to the lens section 31, a timing generator 86, a cooling device 90 for cooling an image pick-up device 88, and a temperature sensor 91 for detecting the temperature of the image pick-up device 88.

The controller 80 is configured for example by a computer including a CPU, ROM, RAM, and non-volatile ROM, not shown in the drawings, with a control program stored in the non-volatile ROM. Control of each section connected to the controller 80 is performed by executing the control program in the CPU.

While not illustrated in the drawings, the lens section 31 is configured, for example, including such components as a lens set made up from plural optical lenses, an aperture adjustment mechanism, a zoom mechanism and an autofocus mechanism. The lens set is provided so as to be movable along the arrow Z direction of FIG. 2 in order to focus on the imaging subject PS. The aperture adjustment mechanism is a mechanism for changing the diameter of the aperture section so as to adjust the amount of light incident to the image pick-up device 88. The zoom mechanism is a mechanism for adjusting the placement position of the lenses to perform zooming The autofocus mechanism is a mechanism for adjusting the focus according to the separation distance between the imaging subject PS and the imaging device 10.

Light from the imaging subject PS passes through the lens section 31 and forms an image on the image pick-up device 88 as a subject image.

Although not illustrated, the image pick-up device 88 is configured to include light-receiving portions that each correspond to a respective pixel out of plural pixels, horizontal transmission paths, and vertical transmission paths, and the like. The image pick-up device 88 has the function of photoelectrically converting the subject image focused on the image pick-up face of the image pick-up device 88 into an electric signal. For example, an image sensor such as a charge coupled device (CCD) or a metal oxide semiconductor (MOS) is used for the image pick-up device 88. A CCD is employed as the image pick-up device 88 in the present exemplary embodiment.

The image pick-up device 88 is controlled by a timing signal from the timing generator 86, and photoelectrically converts the incident light from the imaging subject PS at each light-receiving portion.

The signal charge that has been photoelectrically converted at the image pick-up device 88 is voltage-converted into an analog signal by a charge-voltage conversion amplifier 92, and output to a signal processor 94.

The timing generator 86 includes a resonator for generating a reference clock (system clock) for operating the imaging section 30. The reference clock is for example supplied to each section, and the reference clock is divided to generate various timing signals. For example, timing signals are generated expressing a vertical synchronization signal, a horizontal synchronization signal and an electronic shutter pulse, and supplied to the image pick-up device 88. A sampling pulse for use in correlated double sampling (CDS) and a timing signal such as a conversion clock for use in analogue-digital conversion are generated and supplied to a signal processor 94.

The signal processor 94 is controlled by the timing signal from the timing generator 86, and is configured including a correlated double sampling (CDS) circuit that performs correlated double sampling processing on the input analog signal, and an analog/digital (A/D) converter that converts the analog signal that has been subjected to the correlated double sampling processing into a digital signal. The signal processor 94 is also configured including a processing section that performs A/D sampling on a feed-through section and a signal section, and processing to calculate difference data between each digital value of the feed-through section and the signal section.

Correlated double sampling processing aims to reduce such features as noise included in the output signal of the image pick-up device 88, and is processing to obtain image data by taking a difference between a feed-through section level included in the output signal for each single pick-up element (pixel) of the image pick-up device 88 and a signal section level corresponding to the image component.

The digital signal that has been correlated double sampling processed is output to a memory 96 where it is temporarily stored. The image data temporarily stored in the memory 96 is transmitted to the image processing device 100 through the communications I/F 84.

The cooling device 90 is, for example, configured by a Peltier device and the cooling temperature is controlled by the controller 80. When the imaging subject PS is a chemiluminescent sample there is sometimes a detrimental effect on image quality due to such factors as an increase in dark current when the temperature of the image pick-up device 88 increases, because imaging is performed without excitation light illumination for a comparatively long exposure. The controller 80 therefore performs Pulse Width Modulation (PWM) control on the cooling device 90 while monitoring the temperature of the image pick-up device 88 detected by the temperature sensor 91, and cools the image pick-up device 88 such that the temperature of the image pick-up device 88 is maintained at the cooling temperature instructed from the image processing device 100.

Figure 5:
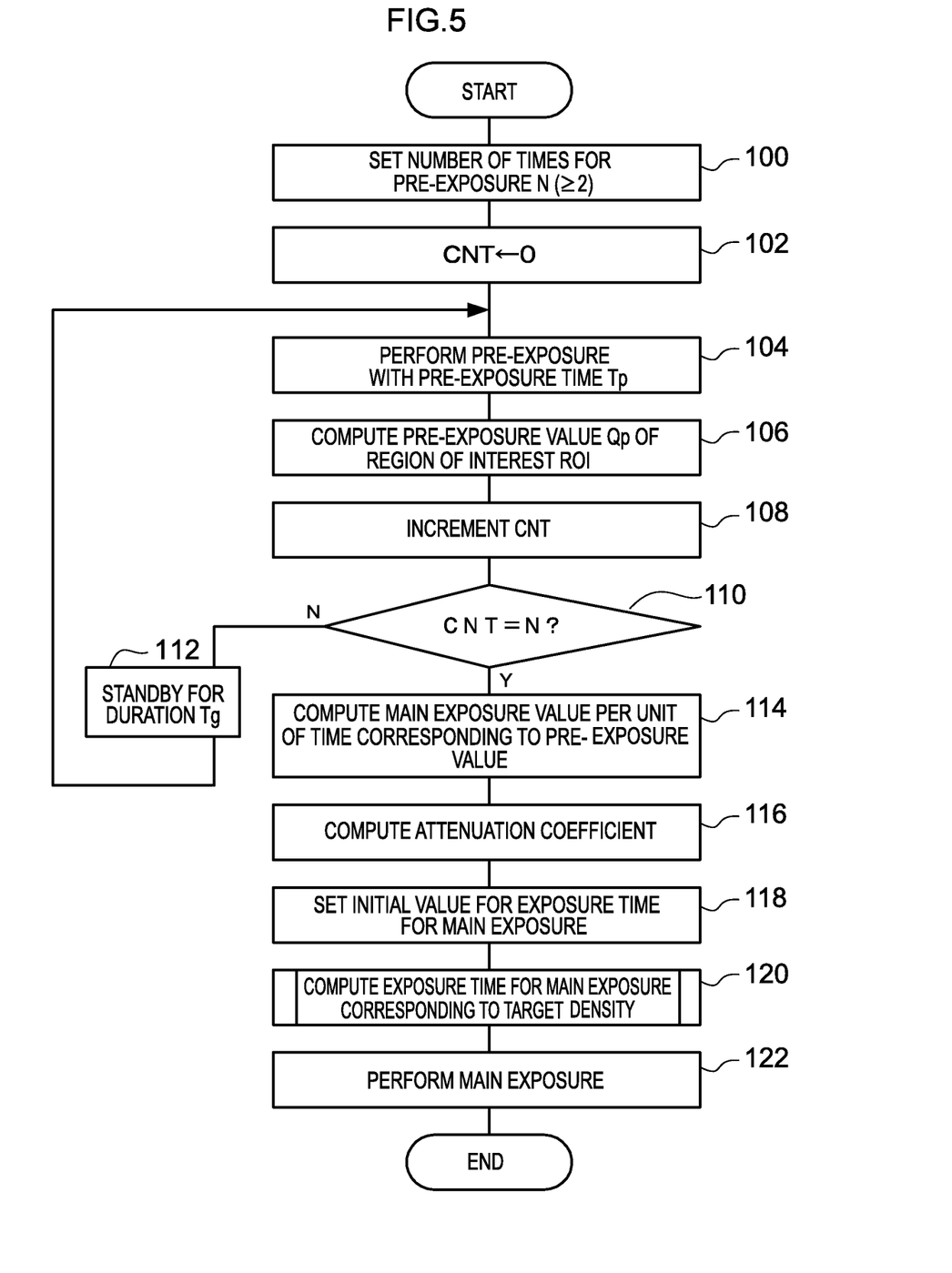
FIG. 5 is a flow chart of a control routine executed by a CPU 70A of the image processing device 100.
Figure 6:
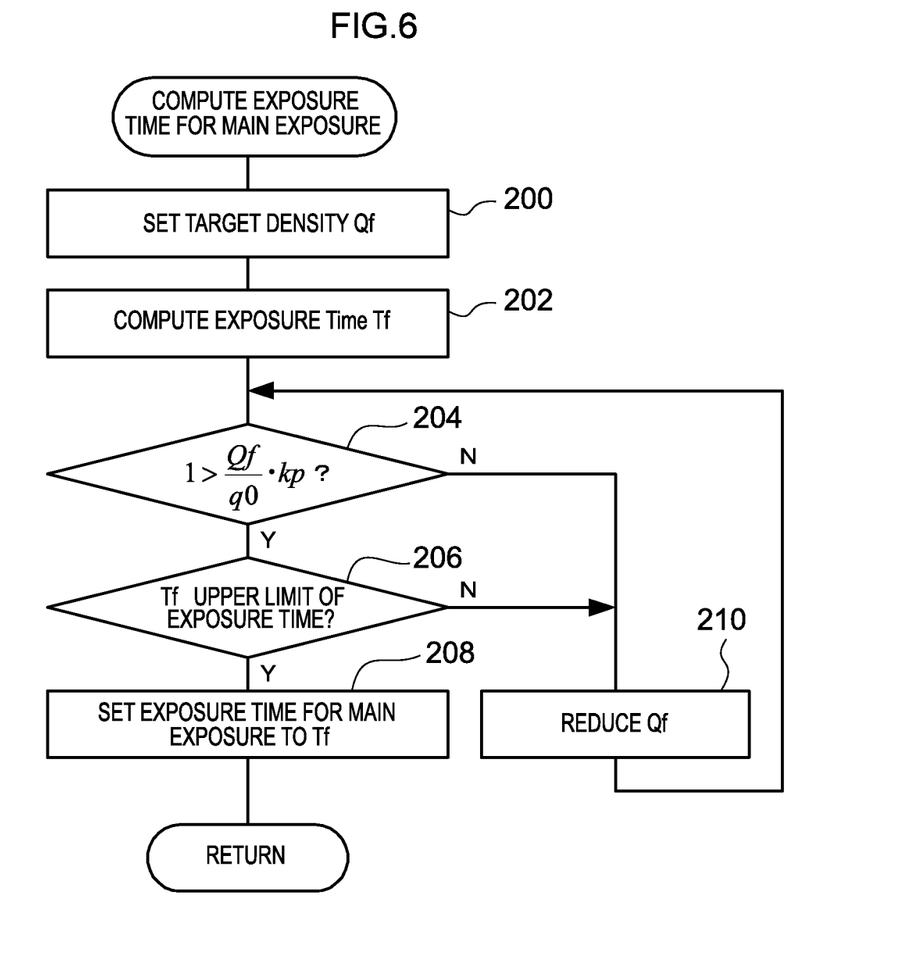
FIG. 6 is a flow chart of a control routing executed by the CPU 70A of the image processing device 100.

Explanation next follows regarding operation of the present exemplary embodiment, with reference to the flow charts of FIG. 5 and FIG. 6 that illustrate processing executed in the CPU 70A of the image processing device 100.

The flow chart shown in FIG. 5 is executed when a user places the imaging subject PS in the imaging subject placement section 40 and operates the operation section 72 to instruct imaging. Explanation follows regarding a case in the present exemplary embodiment in which the imaging subject PS is a chemiluminescent sample.

Figure 7:
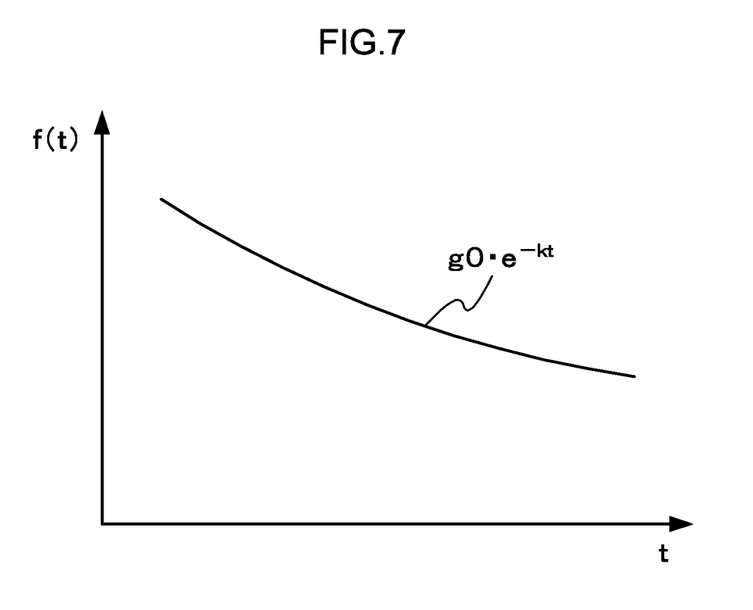
FIG. 7 is a graph illustrating attenuation characteristics of a chemiluminescent sample.

The exposure value (light emission intensity) f (t) of the chemiluminescent sample imaging subject PS exhibits the characteristic of attenuating with the passage of time, as shown in FIG. 7, as expressed in the following equation.

$$f(t) = q0 \cdot e^{-kt} \quad (1)$$

Here, k is an attenuation coefficient expressing the degree of attenuation, q0 is the exposure value of the imaging subject PS, namely the initial value of light emission intensity (f (t)=q0 when t=0). Hence the light emission characteristics, namely the attenuation characteristics, of the imaging subject PS can be derived by determining q0 and k. In the present exemplary embodiment, as explained in detail later, pre-exposure is performed plural times, q0 and k are derived from the results thereof, and the main exposure time is then calculated according to the target density of the imaging subject PS.

First at step 100 the number of times for pre-exposure N is set. The number of times for pre-exposure N is set as 2 or greater, and may be set by user selection or may be set automatically to a predetermined number. In the present exemplary embodiment explanation is given of a case in which the number of times for pre-exposure N is set to 2.

At step 102 a counter CNT is set to 0.

At step 104 the imaging subject PS is pre-exposed with a binning number (pixel-summing number) Bp for a predetermined pre-exposure time Tp to acquire a pre-exposure image.

For example when Bp=8 then 8×8 pixels are pixel summed to obtain a pre-exposure image. In the present exemplary embodiment the image pick-up device 88 has a binning function, namely functionality for pixel summing, and pixel summing is performed using the pixel summing function of the image pick-up device 88. Note however that configuration may be made such that binning is not performed with the image pick-up device 88, and after the pixel values of each of the pixels have been acquired pixel summing processing is then performed for each set of 8 by 8 (8*8) pixels. In the present exemplary embodiment the imaging subject PS is a chemiluminescent sample and so excitation light is not illuminated.

At step 106 the pre-exposure value Qp is calculated for a predetermined region of interest ROI in the pre-exposure image. More specifically, in cases such as for example a membrane with Western blotting, the region of interest ROI is set as x by y (x*y) pixels near to the center of a band where the signal level is highest in the pre-exposure image, and the average value of each of the pixels in this region of interest ROI is set as the pre-exposure value Qp. Note that the region of interest ROI is not limited to being set thereto. The pre-exposure value Qp is also not limited to the average value of the region of interest ROI and pre-exposure value Qp may be set as another value such as the median value.

At step 108 the counter CNT is incremented by 1.

At step 110 determination is made as to whether or not the counter CNT has reached the number of times for pre-exposure N. Processing proceeds to step 112 when there is a match for the counter CNT and the number of times for pre-exposure N, and processing proceeds to step 114 when there is no match.

At step 112 standby is adopted until a predetermined pre-exposure interval Tg has elapsed. Then processing returns to step 104 after the Tg duration has elapsed and the second time of pre-exposure is performed. Pre-exposure is accordingly executed until the counter CNT reaches the number of times for pre-exposure N. In the present exemplary embodiment the number of times for pre-exposure N is 2, and so processing proceeds to step 114 after pre-exposure has been executed the second time.

At step 114 the main exposure value per unit of time corresponding to the pre-exposure values is calculated.

For example if the pre-exposure value is Qp1 the first time, the pre-exposure value is Qp2 the second time and the binning number during main exposure is Bm, then the main exposure value per unit of time corresponding to pre-exposure value Qp1 the first time is denoted qm1 and the main exposure value per unit of time corresponding to the pre-exposure value qm2 the second time is denoted qm2, and these values can be calculated according to the following equations.

$$qm1 = \frac{Qp1}{Tp} \cdot \frac{Bm^2}{Bp^2} \quad (2)$$

$$qm2 = \frac{Qp2}{Tp} \cdot \frac{Bm^2}{Bp^2} \quad (3)$$

The pre-exposure binning number Bp is preferably set larger than the main exposure binning number Bm. Namely the pixel size during pre-exposure is preferably larger than the pixel size during main exposure. The sensitivity in pre-exposure can thereby be raised, enabling the pre-exposure time to be shortened.

At step 116 the attenuation coefficient k, namely the slope of the main exposure value per unit of time corresponding to the pre-exposure time is calculated.

Figure 8:
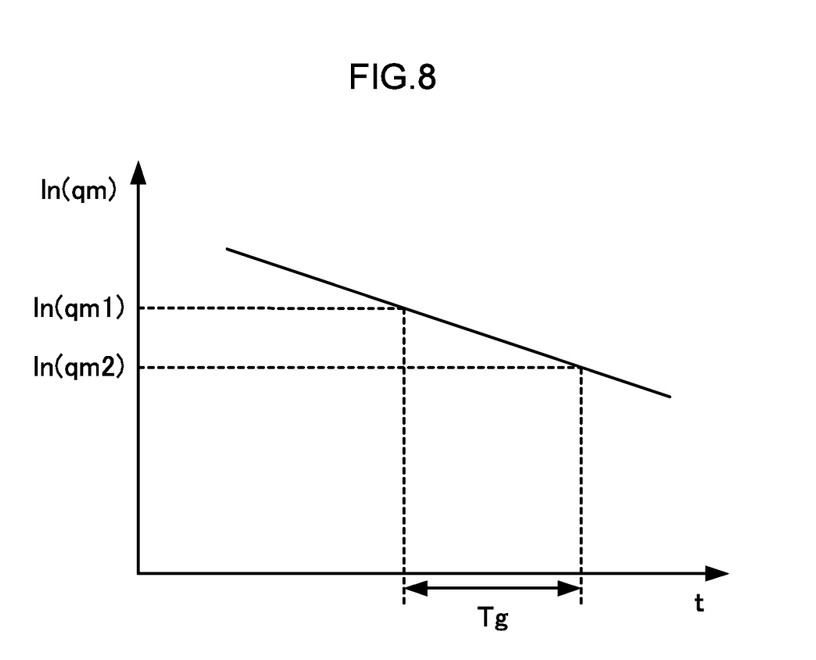
FIG. 8 is a graph for explaining calculation of exposure time for main exposure.

The attenuation coefficient k can be calculated according to the following equation, as shown in FIG. 8.

$$k = \frac{\ln(qm1) - \ln(qm2)}{Tg} \quad (4)$$

Here, ln denotes the natural logarithm.

The initial value q0 of light emission intensity of the imaging subject PS is set at step 118. In the present exemplary embodiment, since pre-exposure is only performed two times, the main exposure value qm2 per unit of time corresponding to the pre-exposure value Qp2 for the second time is set as q0.

The attenuation coefficient k and the initial value q0 are accordingly set as described above. Note that while in the present exemplary embodiment explanation has been given of a case in which pre-exposure is executed two times, pre-exposure may be performed 3 or more times. In such cases configuration may be made such that the main exposure value per unit of time is derived corresponding to the pre-exposure values for each time of pre-exposure, and then the attenuation coefficient k and initial value q0 are derived from these main exposure values using a method such as a method of least squares.

At step 120 a main exposure time corresponding to the target density of the imaging subject PS is calculated by processing as illustrated in FIG. 6.

At step 200 shown in FIG. 6, the target density (target exposure amount) Qf of the imaging subject PS is set. The target density Qf may be set by a user or may be set to a predetermined density.

At step 202 the exposure time Tf for main exposure is set. The exposure time Tf may be set by a user or may be set to a predetermined duration.

In order to express the exposure value of the imaging subject with Equation (1) the required target exposure amount for main exposure is obtained by integrating Equation (1) as shown in the following equation.

$$Qf = \int_0^{Tf} q0 \cdot e^{-kt} \quad (5)$$

The following equation is arrived at by rewriting Equation (5) for Tf.

$$Tf = -\frac{\ln\left(1 - \frac{Qf}{q0} \cdot k\right)}{k} \quad (6)$$

When setting the exposure time Tf for main exposure at this stage a first condition is that the element inside the brackets in Equation (6) must be positive. When the upper limit value to the exposure time for main exposure is predetermined then a second condition is that the exposure time Tf must not exceed the upper limit value.

Then at step 204 determination is made as to whether or not the first condition has been satisfied. Namely determination is made as to whether or not the following inequality is satisfied.

$$1 > \frac{Qf}{q0} \cdot kp \quad (7)$$

Processing proceeds to step 206 when the first condition is satisfied. Processing proceeds to step 210 when the first condition is not satisfied.

At step 206 determination is made as to whether or not the second condition is satisfied, namely determination is made as to whether or not the exposure time Tf is a predetermined upper limit value for exposure time during main exposure or less. Processing proceeds to step 208 when the second condition is satisfied, and processing proceeds to step 210 when the second condition is not satisfied.

At step 208 the current exposure time Tf is set as the exposure time for main exposure. However, when determination is negative at step 204 and step 206, namely when either the first condition or the second condition is not satisfied, then processing proceeds to step 210 and the value of the target density Qf is lowered. When reducing the target density Qf, the level may be reduced by a single step or by plural steps.

After thus setting the exposure time for main exposure processing returns to FIG. 5 and main exposure is performed at step 122 with the exposure time Tf and the binning number Bm. The imaging subject PS is accordingly imaged at the target density Qf.

Hence in the present exemplary embodiment pre-exposure is executed plural times, the light emission characteristics (attenuation characteristics) of the chemiluminescent sample imaging subject PS are derived according to the results of pre-exposure, and the exposure time for main exposure is determined based on the derived attenuation characteristics. Consequently, due to setting an appropriate exposure time for main exposure, poor density can be prevented and good imaging can be performed even when the imaging subject is a chemiluminescent sample that only emits light weakly.

In the present exemplary embodiment explanation has been given of an example in which pre-exposure is performed two times to calculate the exposure time for main exposure. However configuration may be made such that when there is no change in pre-exposure image between the two times, namely when there is no difference between the pre-exposure value Qp1 the first time and the pre-exposure value Qp2 the second time, pre-exposure is re-executed after changing at least one factor out of the exposure time for pre-exposure and/or the binning number for pre-exposure. For example, pre-exposure is re-executed with the exposure time for pre-exposure increased and/or the binning number for pre-exposure increased. The sensitivity is accordingly raised, enabling a more precise determination of the attenuation characteristics to be made.

The configuration of the imaging system 1 explained in the present exemplary embodiment (see FIG. 1 to FIG. 4) is merely an example thereof, and obviously portions of the configuration not required may be omitted, or new portions added to the configuration within a scope not departing from the spirit of the present invention.

The flow of processing of the control program explained in the present exemplary embodiment (see FIG. 5 and FIG. 6) is also merely an example thereof, and obviously steps not required may be omitted, new steps added, and the processing sequence changed within a scope not departing from the spirit of the present invention.

What is claimed is:

1. An imaging device comprising:
    an image pick-up device for imaging a chemiluminescent imaging subject;
    a pre-exposure section that performs pre-exposure of the image pick-up device to the imaging subject a plurality of times to acquire a plurality of pre-exposure images;
    a light emission characteristic calculation section that calculates the light emission characteristics of the chemiluminescent imaging subject that attenuate with the passage of time based on the plurality of pre-exposure images;
    an exposure time calculation section that calculates an exposure time for main exposure corresponding to a target density for the imaging subject based on the light emission characteristics; and
    a main exposure section that performing main exposure to the imaging subject with the calculated exposure time so as to acquire a main exposure image,
    wherein the pre-exposure is re-executed at least with the pixel summing number for pre-exposure increased or with the exposure time for pre-exposure increased when there is no change between the plurality of pre-exposure images, and
    wherein, if the calculated exposure time is not lower than a predetermined value, the exposure time calculation section reduces the target density of the imaging subject and calculates the exposure time for main exposure corresponding to the target density for the imaging subject again.

2. The imaging device of claim 1, wherein the pixel size of the pre-exposure images is larger than the pixel size of the main exposure image.

3. The imaging device of claim 1, wherein:
    the image pick-up device is provided with a pixel summing function; and
    the pixel summing function is employed to set the pixel size of the plurality of pre-exposure images larger than the pixel size of the main exposure image.

4. A non-transitory computer readable medium stored with an imaging program that causes a computer to function as each of the sections configuring the imaging device of claim 1.

5. An imaging method comprising:
    performing pre-exposure of an image pick-up device to a chemiluminescent imaging subject a plurality of times to acquire a plurality of pre-exposure images;
    calculating light emission characteristics of the chemiluminescent imaging subject that attenuate with the passage of time based on the plurality of pre-exposure images;
    calculating, using an exposure time calculation section, an exposure time for main exposure corresponding to a target density for the imaging subject based on the light emission characteristics; and
    performing main exposure to the imaging subject with the calculated exposure time to acquire a main exposure image,
    wherein the pre-exposure is re-executed at least with the pixel summing number for pre-exposure increased or with the exposure time for pre-exposure increased when there is no change between the plurality of pre-exposure images, and wherein, if the calculated exposure time is not lower than a predetermined value, the exposure time calculation section reduces the target density of the imaging subject and calculates the exposure time for main exposure corresponding to the target density for the imaging subject again.

\* \* \* \* \*